United States Patent
Grazioli et al.

(10) Patent No.: US 7,036,703 B2
(45) Date of Patent: May 2, 2006

(54) HAND-HELD WORKING TOOL

(75) Inventors: Mario Grazioli, Chur (CH); Joachim Keck, Eschen (LI)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/766,259

(22) Filed: Jan. 27, 2004

(65) Prior Publication Data

US 2005/0000998 A1 Jan. 6, 2005

(30) Foreign Application Priority Data

Jan. 27, 2003 (DE) ................. 103 03 006

(51) Int. Cl.
*B23Q 5/00* (2006.01)

(52) U.S. Cl. .............. 227/10; 173/2; 173/176; 173/181; 173/4; 702/33; 702/41

(58) Field of Classification Search ............ 173/4, 173/9, 177, 2, 171, 176, 181; 227/10
See application file for complete search history.

(56) References Cited

U.S. PATENT DOCUMENTS

| | | | | |
|---|---|---|---|---|
| 4,051,351 A * | 9/1977 | Mallick et al. | ............... | 700/90 |
| 4,307,325 A * | 12/1981 | Saar | ............... | 388/809 |
| 4,410,846 A * | 10/1983 | Gerber et al. | ............... | 318/490 |
| 5,142,210 A * | 8/1992 | Kojima et al. | ............... | 318/566 |
| 5,531,279 A * | 7/1996 | Biek | ............... | 173/178 |
| 5,903,462 A * | 5/1999 | Wagner et al. | ............... | 700/168 |
| 6,111,515 A * | 8/2000 | Schaer et al. | ............... | 340/680 |
| 6,311,786 B1 * | 11/2001 | Giardino et al. | ............... | 173/1 |
| 6,374,195 B1 * | 4/2002 | Li et al. | ............... | 702/182 |
| 6,430,463 B1 * | 8/2002 | Lysaght | ............... | 700/168 |
| 6,581,696 B1 * | 6/2003 | Giardino | ............... | 173/1 |
| 6,598,684 B1 * | 7/2003 | Watanabe | ............... | 173/2 |
| 6,722,550 B1 * | 4/2004 | Ricordi et al. | ............... | 123/46 SC |
| 6,810,360 B1 * | 10/2004 | Fujishima et al. | ............... | 702/182 |
| 6,830,173 B1 * | 12/2004 | Barber et al. | ............... | 227/131 |
| 2003/0006051 A1 * | 1/2003 | Schmitzer et al. | ............... | 173/49 |
| 2003/0037423 A1 * | 2/2003 | Siegel | ............... | 29/407.01 |
| 2004/0045727 A1 * | 3/2004 | Allums et al. | ............... | 170/1 |

FOREIGN PATENT DOCUMENTS

| | | |
|---|---|---|
| DE | 4405648 | 8/1995 |
| EP | 150669 | 8/1985 |
| EP | 345655 | 12/1989 |

OTHER PUBLICATIONS

Search Report of the German Patent Office.

* cited by examiner

*Primary Examiner*—Scott A. Smith
*Assistant Examiner*—Gloria R. Weeks
(74) *Attorney, Agent, or Firm*—Abelman, Frayne & Schwab

(57) ABSTRACT

The present invention relates to a hand-held working tool, such as a setting device used for driving fastening elements such as nails, bolts, pins and the like into a surface, or an at least partially percussive hand-held tool having a housing part (11) and a working mechanism such as a setting or striking mechanism arranged inside the housing of the device and having at least one sensing device (17) for sensing acceleration forces occurring during a setting or striking pulse as well as a handle. For improving this type of hand-held working tool (10) an interface (30) for data communication and data output is arranged on the hand-held working tool.

23 Claims, 13 Drawing Sheets

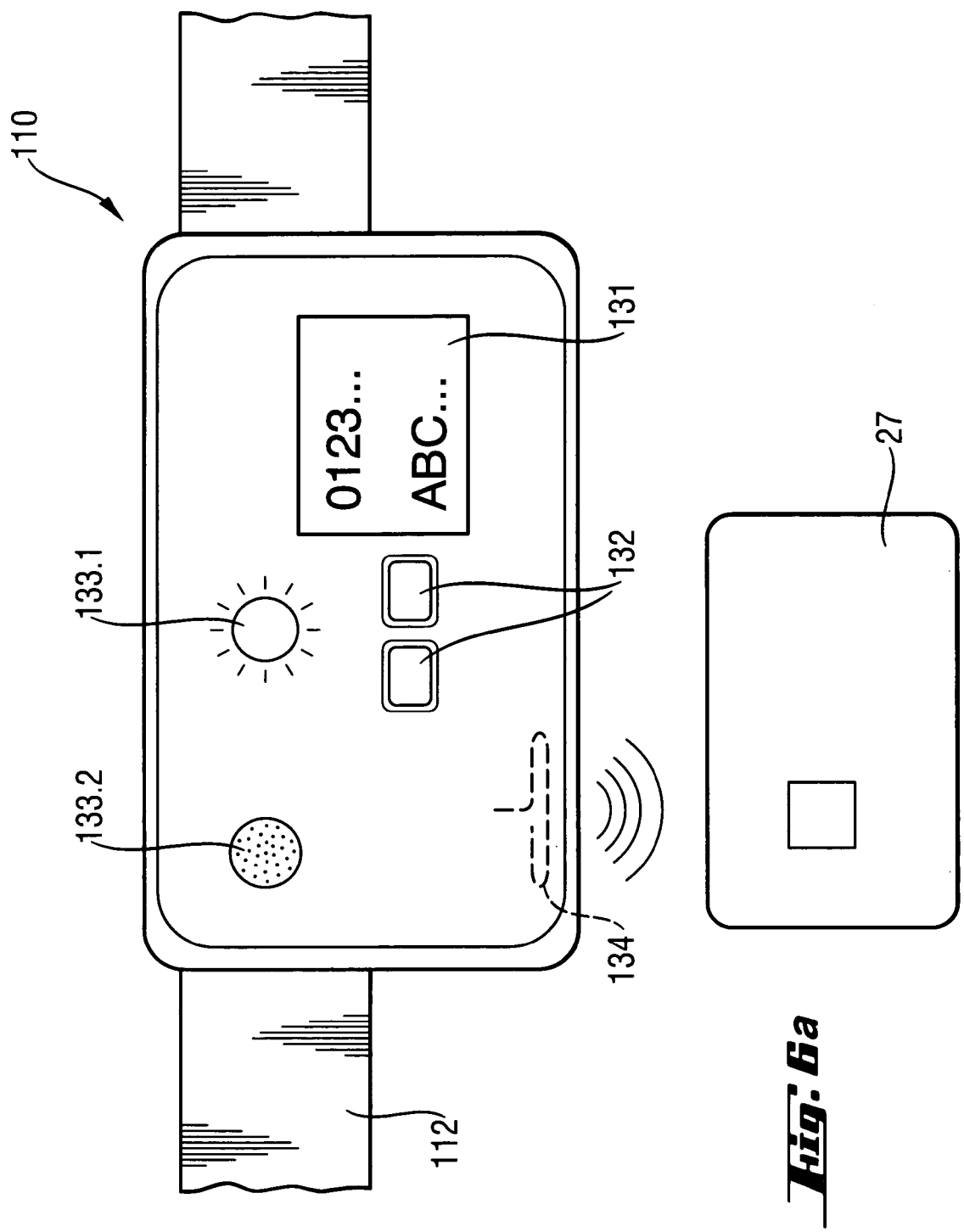

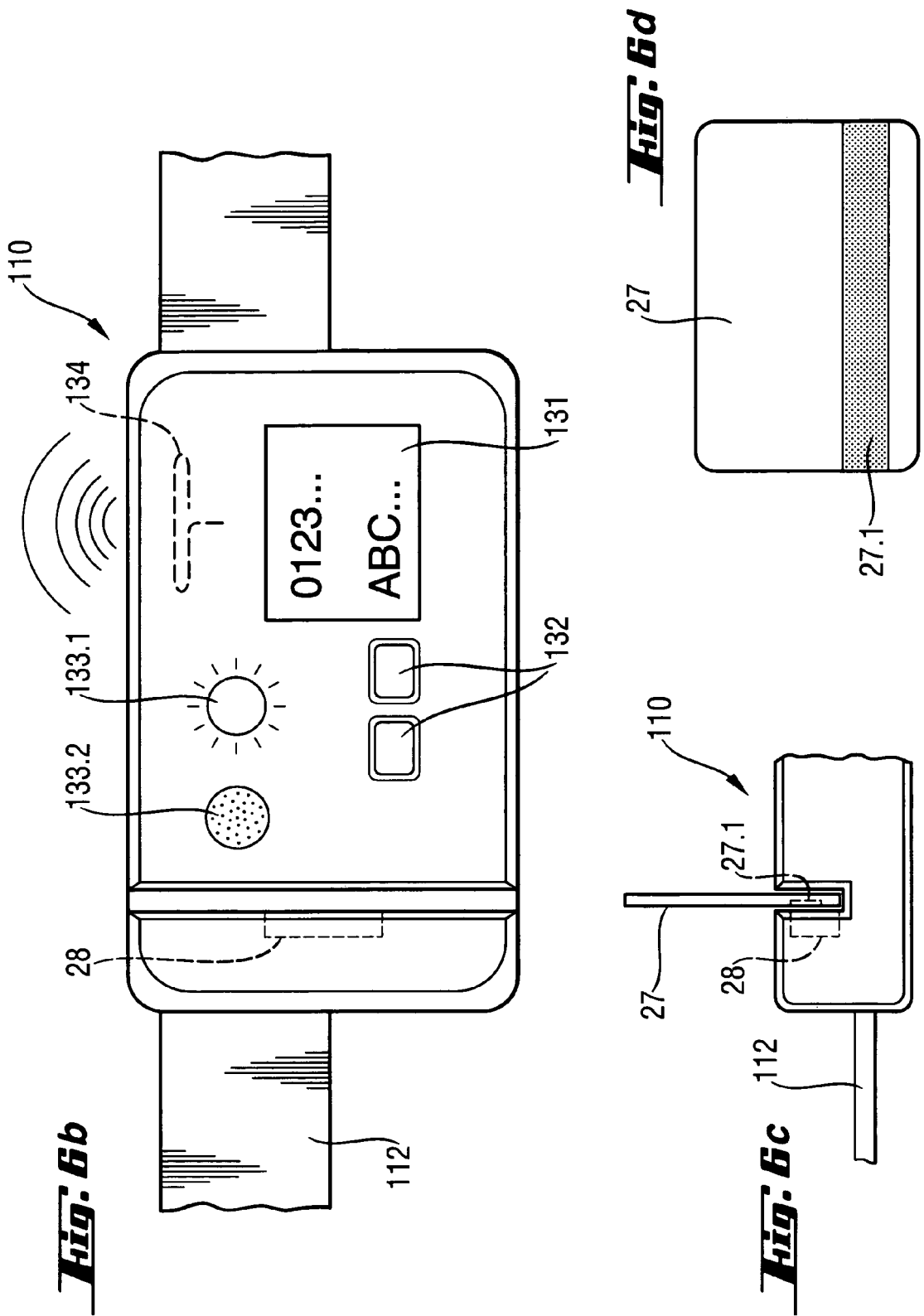

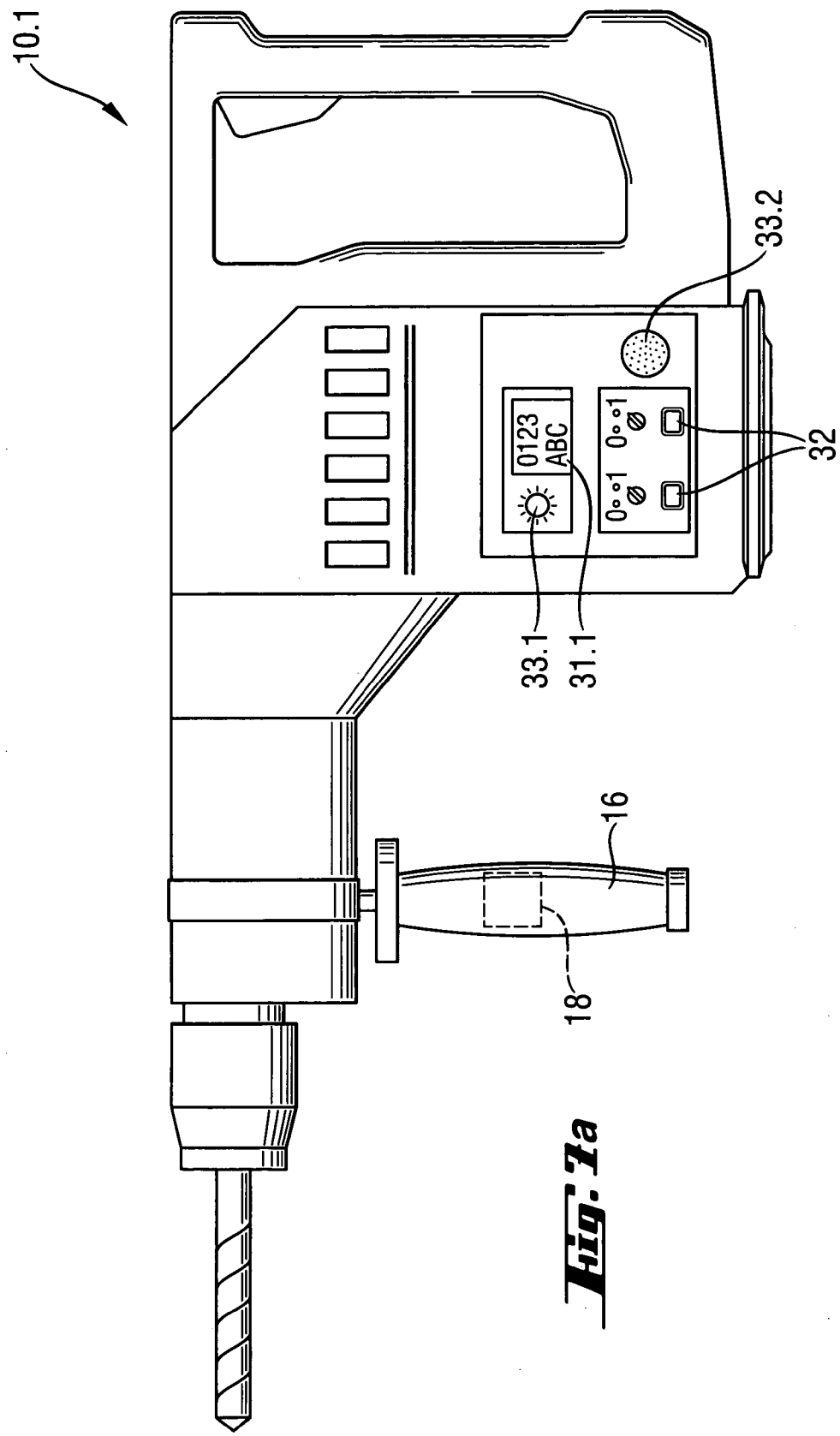

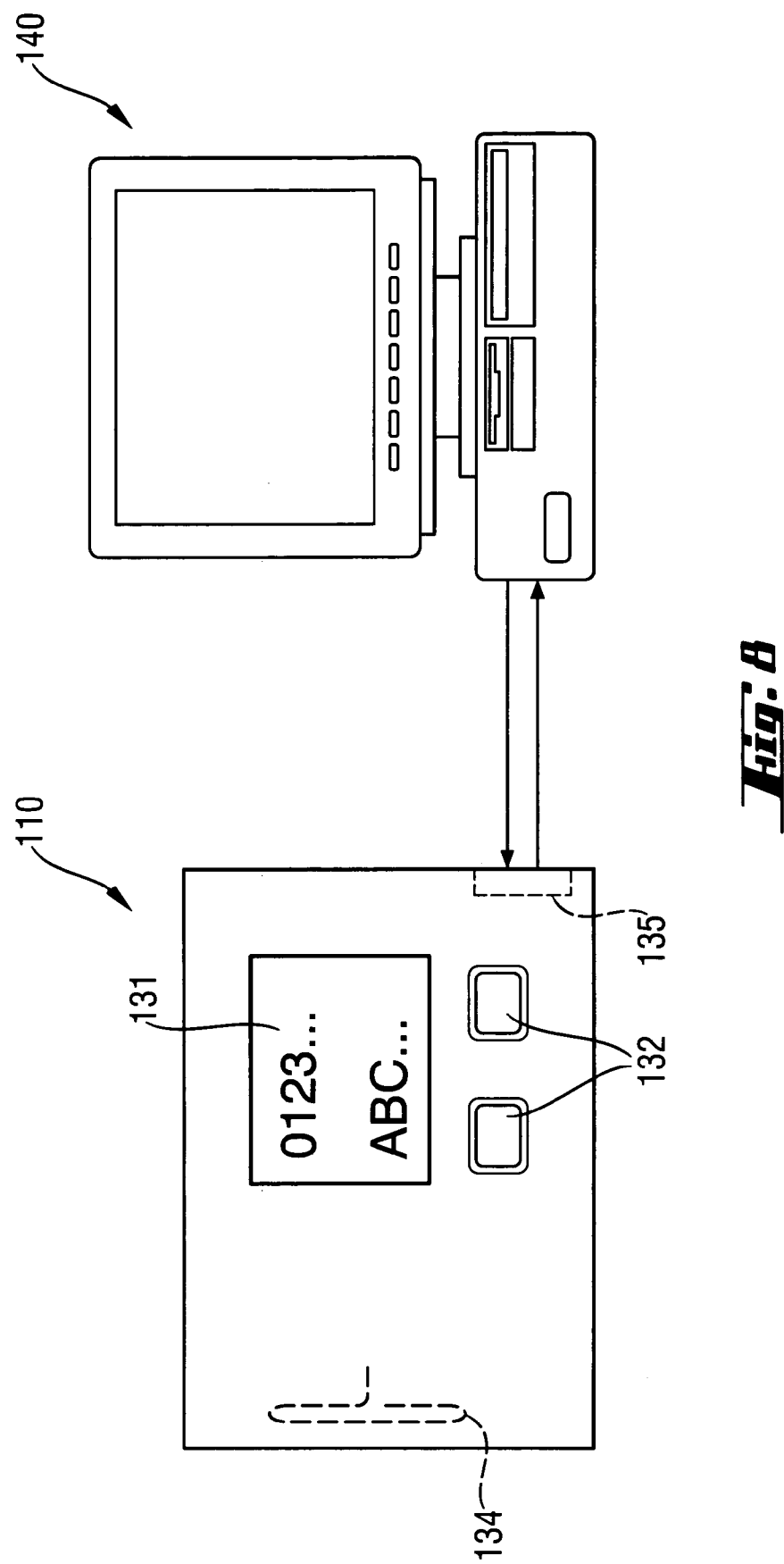

HAND-HELD WORKING TOOL

BACKGROUND OF THE INVENTION

1. Field of the Invention

The present invention relates to a hand-held device having a housing and a work mechanism such as a setting or striking mechanism in said housing of the device and at least one sensing device for detecting acceleration forces $a(t)$ occurring during a setting or striking impulse and having a handle part, wherein an interface for data communication and/or for data output arranged on the said hand-held tool. The invention also relates to an interface for utilization with a hand-held device, wherein an interface unit includes a device for data communication with the interface for data communication with said hand-held working tool.

There is a great variety of such working tools, for example setting tools that can be operated with solid, gaseous or liquid fuels or with air pressure or compressed air are operated. In combustion-operated setting tools, a setting piston is operated using combustion gases, by which fastening elements are then driven into a surface. Such working tools can, however, also be found in at least partially percussive hand-held tools, such as percussion drills or chiseling-devices. Further examples of such tools are power drills, hammer drills, picks, screw-driving tools, grinding devices, circular saws, chainsaws and jigsaws.

2. Description of the Prior Art

Such working tools include acceleration, impact or vibration transmitted to the operator of the device via a working mechanism configured as a setting or striking mechanism in the housing of the device and can have detrimental effects on the operator as a result of intensive usage of such hand-held tools. It is therefore reasonable to limit the exposure time of an operator to such working tools.

One problem lies in the determination of the acceleration values transmitted to the specific operator of a working tool. Setting tools or drills can be run on various power settings. Generally, only the parameters for the maximum vibrations that occur are stated, and it is therefore difficult for the operator to determine the exact acceleration value for a specific setting of the tool the operator is using. If the stated maximum acceleration of a working tool for the determination of the maximum working or exposure time on the working tool is used, then the tool may be used by the operator only for a short period of time.

Accordingly, an acceleration sensor, which acts as a switch for operating a safety switch disclosed in EP 0 345 655 for known similar type of power drill. Via this safety switch, the electric device is switched off at specific rotational acceleration values independent of the bearing. In this hand-held tool, only acceleration peaks are detected, which serve to switch off the hand-held tool in case of tool blockage.

SUMMARY OF THE INVENTION

The object of the present invention is to provide a working tool wherein the above-mentioned drawbacks are eliminated and the operator receives information relating to acceleration or vibration strain within an accepted time interval. This is achieved by a hand-held device having a housing and a work mechanism such as a setting or striking mechanism in said housing of the device and at least one sensing device for detecting acceleration forces $a(t)$ occurring during a setting or striking impulse and having a handle part, wherein an interface for data communication and/or for data output arranged on the said hand-held tool. This objective is also achieved by an interface for utilization with a hand-held device, wherein an interface unit includes a device for data communication with the interface for data communication with said hand-held working tool.

Accordingly, it is sufficient if an interface for data communication and/or data output of a sensing device for the picking up of acceleration and/or vibration strain is arranged on the hand-held working tool. The data picked up by the sensing device relating to acceleration and/or vibration load can be displayed to the operator via the internal data output in the device, or transferred to an external device via the interface for data communication, whereby this data can be displayed to the operator.

Advantageously, the hand-held tool has an evaluation and storage mechanism for processing and storing the data picked up by the sensing device. This measure enables the data picked up by the sensing device to be processed and filtered in the device so that only the data that is relevant to the criteria, upon which the evaluation of the data in the evaluation and storage unit is based, are transmitted or output via the interface. Advantageously, the sensing device has an acceleration sensor arranged on a handhold of the hand-held tool. Accelerations acting on an operator can thus be picked up using the acceleration sensor.

The sensing device comprises a discriminating means which enables the differentiation of accelerations and impulses caused by real setting pulses and accelerations and impulses caused by other acceleration forces. The discriminator can be used as a pressure sensor for gaseous media in conjunction with the working volume. The gas compression waves caused by a setting operation in the working mechanism can be evaluated using this pressure sensor and the data acquired by the acceleration sensor and thus associated with the setting process.

The discriminator means could also be coupled with an electronic trigger switch to assure that the actual firing process is detected by the discriminator means.

It is advantageous for an external data output if the interface arranged on the hand tool is an external interface unit, which is configured as a vibration dosimeter or vibration load measuring device, which can receive the data via a device for data communication from the interface to the data communication device on the hand-held tool. This interface can also regulate the data conveyed by the sensing device via an evaluation and storage device for processing and storing. Accordingly, an evaluation of the data measured can also take place in the external interface. If the interface features a visual data reproduction unit, then the operator can read current acceleration or vibration dosis rates on the data reproduction unit, i.e. the display, on the external interface, in the shape of a watch or a small device that can be clipped to a belt. The data reproduction unit can be controlled via control units.

Data output can be carried out via signals, such as visual or acoustic signals. These signals can send out an alarm when a maximum permitted acceleration dosis rate or acceleration force from the interface has been determined. Such signals can be applied to the interface or the hand-held tool directly.

The evaluation and storage mechanism can include a microprocessor running an algorithm or a program, which conveys a physiological strain gauge out of the accelerator measurement data to an operator identified by the evaluation and storage device attached to the device or interface. In another feature it would also be advantageous when providing user-specific information to have a chip card or magnetic strip card on which user-specific identifying characteristics are stored. The data stored here could either be transmitted to the evaluation and storage mechanism of the interface or the hand-held tool via a data reading device or via the interface for data communication or the device for data communication.

In an advantageous embodiment, a method to trigger the microprocessor to leave the sleep-mode of the sensor mechanism and/or the microprocessor is provided. Power is saved when the sensor mechanism and/or the microprocessor are transported into a sleep-mode, which can be stopped by a trigger impulse or a trigger method. The power intake in sleep-mode can average three micro amperes in comparison to a power intake of 10 milliamperes in an active-mode. Such triggers can also be provided for with the same advantages for the electronic controls of the interface.

Advantageously, the sensor mechanisms and/or the evaluation and storage mechanism arranged on the hand-held tool or on the interface contain a method for real-time measurements. The measuring data can thus be attributed to real times and time periods particularly important for the calculation of acceleration force or vibration dosis rates, which have an effect on operators.

Preferably, the evaluation and storage mechanism is separated into various storage sectors, to which a specific operator could be assigned via user-specific identification characteristics. Thus, the same interface can be utilized by numerous operators on the same day whereby the individual storage sections act as accounts for the operators, in which acceleration forces allocated to each operator are stored. These storage sections can be provided in the evaluation and storage mechanism in the device and in the evaluation and storage mechanism in the interface.

Advantageously, the interface is a vibration dosimeter in the form of a vibration or acceleration force measuring device carried by the operator of the hand-held tools during the working day, which sums up all acceleration forces or acceleration forces recorded during the day and shows them to the operator.

The vector acceleration values $\underline{a}(t)$, the time t and time segments T, the number of events such as the number of settings n, the number of working activities i and their duration $T_i$ are measured by the device. From the acceleration values $\underline{a}(t)$ frequency-adjusted oscillations or acceleration values $a_{hv}(t)$ can be calculated, which are used in application of the following formula for calculating the acceleration load A attained on a workday in a work period $T_0$.

$$A = \sqrt{\left(1/T_0 \sum_{i=1}^{n} a_{hvi}^2 T_i\right)}$$

wherein:
$a_{hvi}$=total value of oscillations or accelerations of the $i^{th}$ operation with a working tool,
n=number of single oscillation effects such as setting operations,
$T_i$=duration of the $i^{th}$h operation (i.e. one hour working with a working tool).

The calculated value A from the storage and evaluation mechanism, which is allotted to a specific operator, is constantly compared with a maximal acceleration value $A_{max}$. If the maximal acceleration value $A_{max}$ is surpassed, the operator is notified (acoustically or visually).

The previously illustrated sensor mechanism and the electrical mechanisms required for the working of this device have to be supplied with power. In hand-held tools such as setting tools this can be provided by one or numerous batteries or accumulators or by at least partially hammering hand-held tool devices via a mains connection or a connection to a generator.

BRIEF DESCRIPTION OF THE DRAWINGS

For a better understanding of the invention, its operating advantages and specific objects of the invention, reference is made to the drawings wherein:

FIG. 1b shows a block diagram of the hand-held tool in FIG. 1a;

FIG. 6a shows a third embodiment of an interface in the form of a vibrational strain measuring device in accordance with the present invention;

FIG. 6b–6d shows a fourth embodiment of an interface in the form of a vibrational strain measuring device in accordance with the present invention;

FIG. 7a shows a side view of a third embodiment of a hand-held tool with an integrated vibrational strain measuring device in the form of an at least partially hammer hand tool device in accordance with the present invention;

FIG. 7b shows a block diagram of the hand-held tool in FIG. 7a;

FIG. 8 shows an interface for data evaluation using a processor in accordance with the present invention;

FIG. 9 shows a side view of a pressure sensor used as a discriminator in a setting tool in accordance with the present invention; and.

DETAILED DESCRIPTION OF THE INVENTION

Figure 1A:
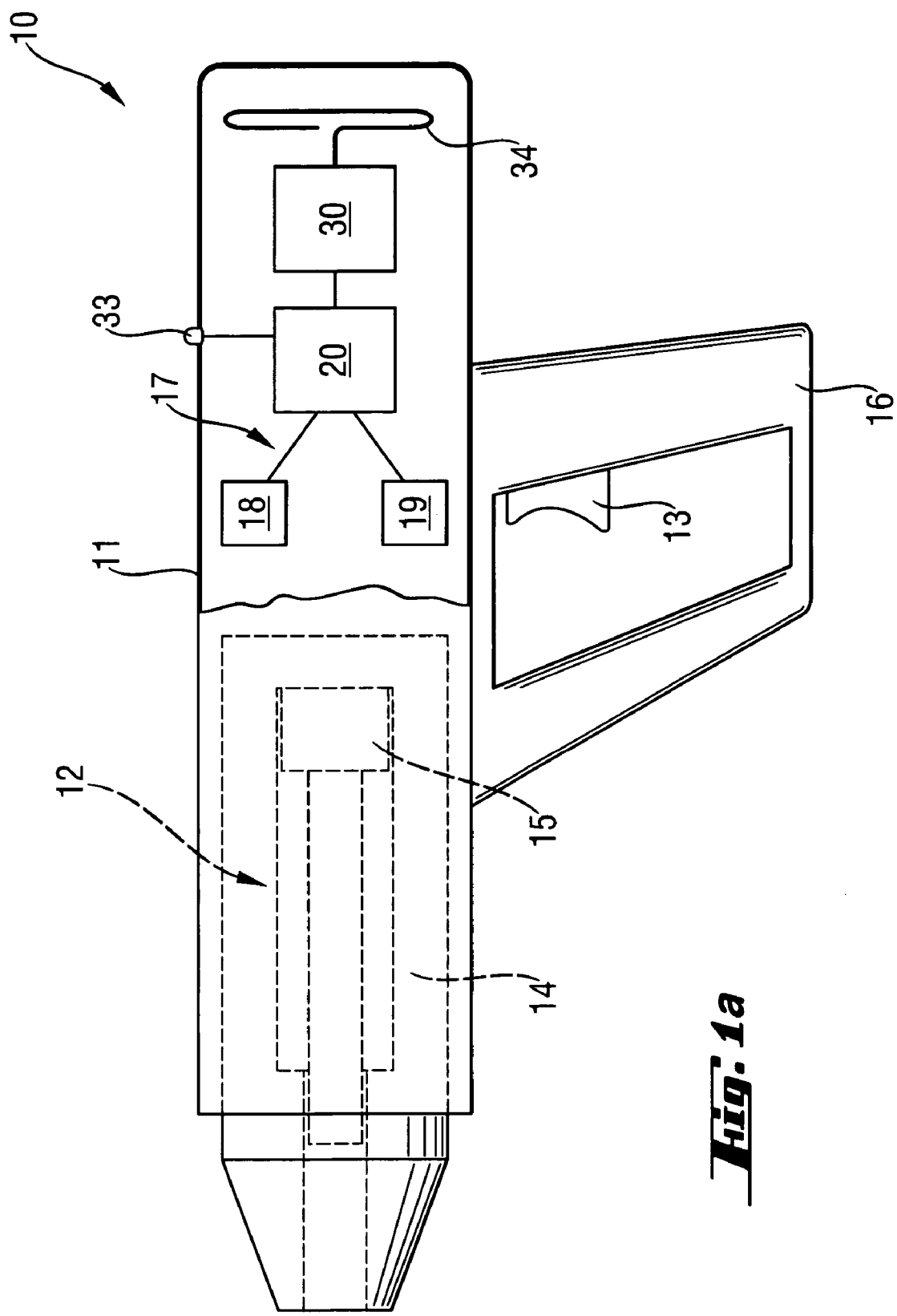
FIG. 1a shows a partially sectional view of a first embodiment of a hand-held tool in the form of a setting tool in accordance with the present invention.

A hand-held tool, as shown in FIG. 1a, is represented by a setting tool. Such a hand-held tool 10 includes a working mechanism 12 such as a hammer mechanism in a housing 11 comprising a piston 15 guided in a piston guide 14 driven by an expanding agent, not shown in the drawings, when an arranged trigger switch 13 on a setting tool, especially on a handhold 16, and if necessary further safety switches are actuated. The forward-driving piston 15 in a setting process is used to drive a fastening element in front of the piston into a surface.

During such a setting process the operator is exposed to acceleration a(t) or vibrations. The present setting tool houses a sensor mechanism 17, which at least includes an acceleration sensor 18 and a discriminator 19 such as a pressure-sensitive sensor 19.1 connected to the hammer mechanism (see FIG. 9) to record the acceleration and vibrations a(t) released in an actual setting process. Alternatively, a temperature sensor could be utilized as a discriminator. The discriminator 19 serves to differentiate impulses and accelerations caused by the actual setting process from accelerations that are caused when a hand-held tool 10 is dropped or when accelerations are created in some other manner without an actual setting process having taken place.

The acceleration sensor 18 and the discriminator 19 are also connected to an evaluation and storage mechanism 20 arranged in the setting tool, to which the data assimilated from the sensors 18, 19, 19.1 are transmitted via data lines. An interface 30 is also arranged alongside the evaluation and storage mechanism 20, in the hand-held tool, presenting data communication with an external interface, as shown in the existing example (see FIG. 2, 3, 5, 6a and 6b for comparisons). The interface 30 is equipped for data transmission with an antenna 34 or a contact socket for cable contact to the interface or with an infrared transmitter/receiver. Additionally, a visual signal 33 connected to the evaluation and storage mechanism 20 is arranged in the setting tool 10. This signal 33 shows the operator when wear parts, such as the piston 15, have to be replaced after a certain amount of completed settings.

Figure 1B:
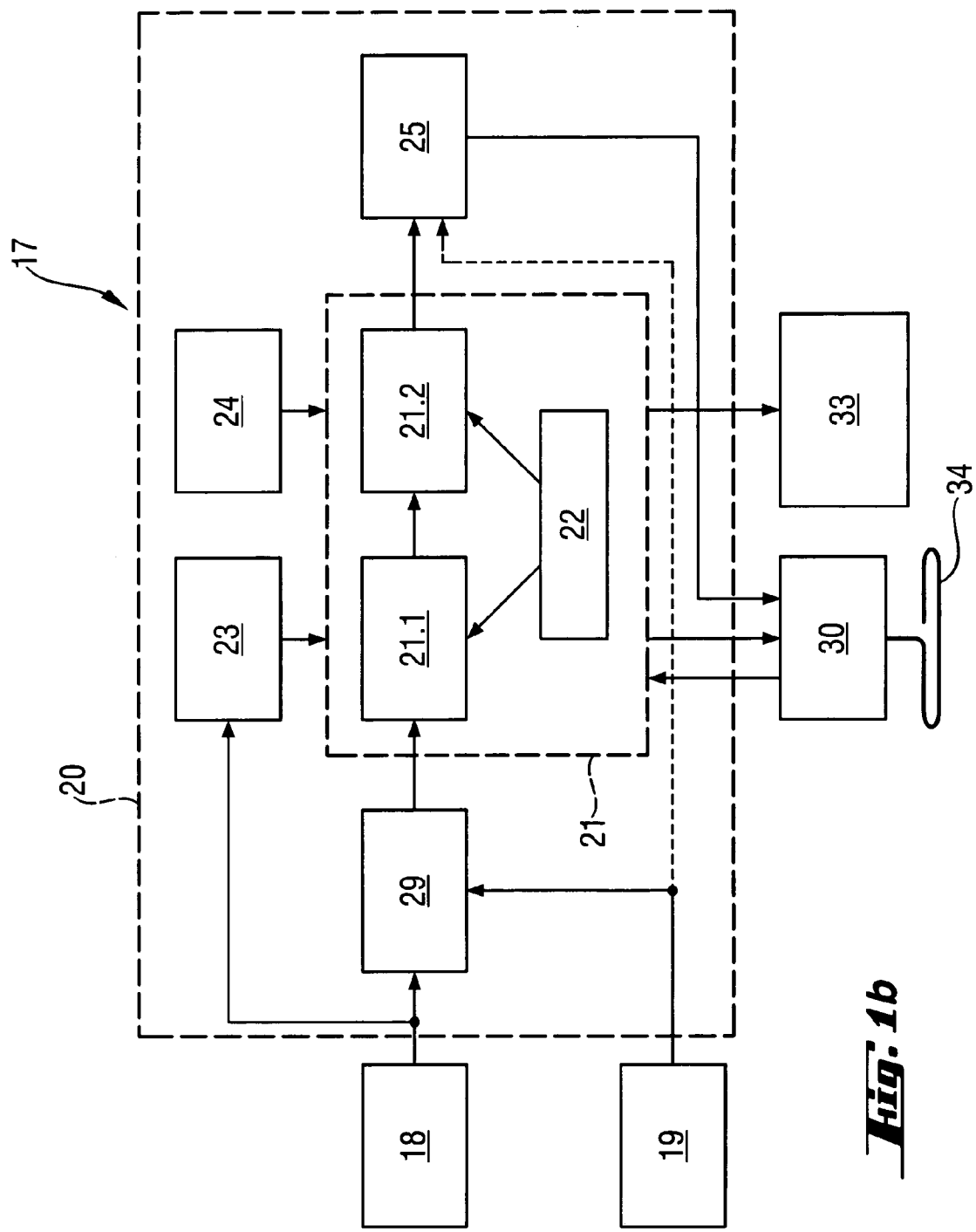

FIG. 1b includes the design and function of the sensor mechanism 17 and the evaluation and storage mechanism 20. A micro processor 21 in the evaluation and storage mechanism 20 will be aroused from its sleep-mode, previously incorporating the microprocessor 21, by the acceleration sensor 18 via an initialization impulse 23. A Piezo-bimorph sensor is used as the acceleration sensor 18. A filter 29 such as an analogue/digital converter measures the first value from the acceleration sensor 18 just 100 micro seconds after "waking" and every 52 micro seconds a new value is recorded until a specific sum of 150 of measuring values have been attained. The evaluation 21.1 in the microprocessor 21 is carried out via an algorithm 22 simultaneously generating a software-controlled data filter 21.2, which determines the data that is to stored as acceleration values belonging to an actual setting process or working process in a storing unit 25 of the evaluation and storage mechanism. A discriminator 19 such as a temperature or pressure-sensitive sensor (see 19.1 in FIG. 9) is also provided alongside the acceleration sensor 18 on the hand-held tool.

If the discriminator 19 is shown as a pressure sensor (see 19.1 in FIG. 9) then the data will be added to the filter 29, as illustrated in FIG. 1b, which transforms the measuring data to digital data and feeds the data to the microprocessor 21 for further processing and evaluation. The data from the discriminator 19 recognizes actual setting processes. When the algorithm 22 or evaluation program in the microprocessor 21 recognizes a real setting, then the measuring data taken from the acceleration sensor 18 is transmitted to the storage unit 25. Additionally, a setting was carried out in a special storage section of the storage unit 25, and thus information on the number n (FIG. 10) of completed setting processes with the setting device or hand-held tool is contained in the storage unit 25. The evaluation and storage mechanism 20 also acts as a real-time medium 24 for conveying the absolute starting time to and the temporal period T (FIG. 10) of a setting process and the acceleration values(t) in this setting process. In the storage unit 25, appropriate times $t_0$, T are attributed to the acceleration and vibration values a(t), $a_{hv}(t)$.

The evaluation and storage mechanism 20 is also designed to recognize a setting process without a discriminator 19, i.e. when a discriminator 19 fails due to an operational disturbance. The algorithm 22 provides for the condition that the maximum of the first 15 measuring values must have a value above 20 and below half of the maximum of all measuring values, and that the maximum must occur before the 80$^{th}$ measuring value. When these conditions are met, then the process is stored as a setting.

The microprocessor 21 returns to the sleep-mode after a period of waiting e.g. 200 milliseconds (in order to prevent a double trigger). Additionally, the discriminator 19 can include a temperature sensor. The measuring values of the temperature sensors can also be digitally relayed to the evaluation and storage mechanism 20 and directly imported to the storage unit 25, synchronously with the detected acceleration a(t), $a_{hv}(t)$, A and time data $t_0$, T (dotted line in FIG. 1b). In a further feature, the storage unit 25 and the microprocessor 21 are connected to an interface 30 for data communication. The data collected are transmitted to an external interface, via this interface 30, such as that illustrated in the FIGS. 2, 3, 5, 6a, 6b and 8, where the data is made available to an operator or service personnel. Further details can be found in the descriptions for the corresponding Figs.

The operator sees a visual signal 21 on the microprocessor 21, via a signal means 33, shown as a light-emitting diode, upon reaching a specific number of settings completed which tells him/her that certain wear parts of the hand-held working tool 10 must be replaced. The microprocessor 21 thus transmits an appropriate alarm to the signal 33 upon attaining n=30.000 setting processes in the storage unit 25.

Figure 2:
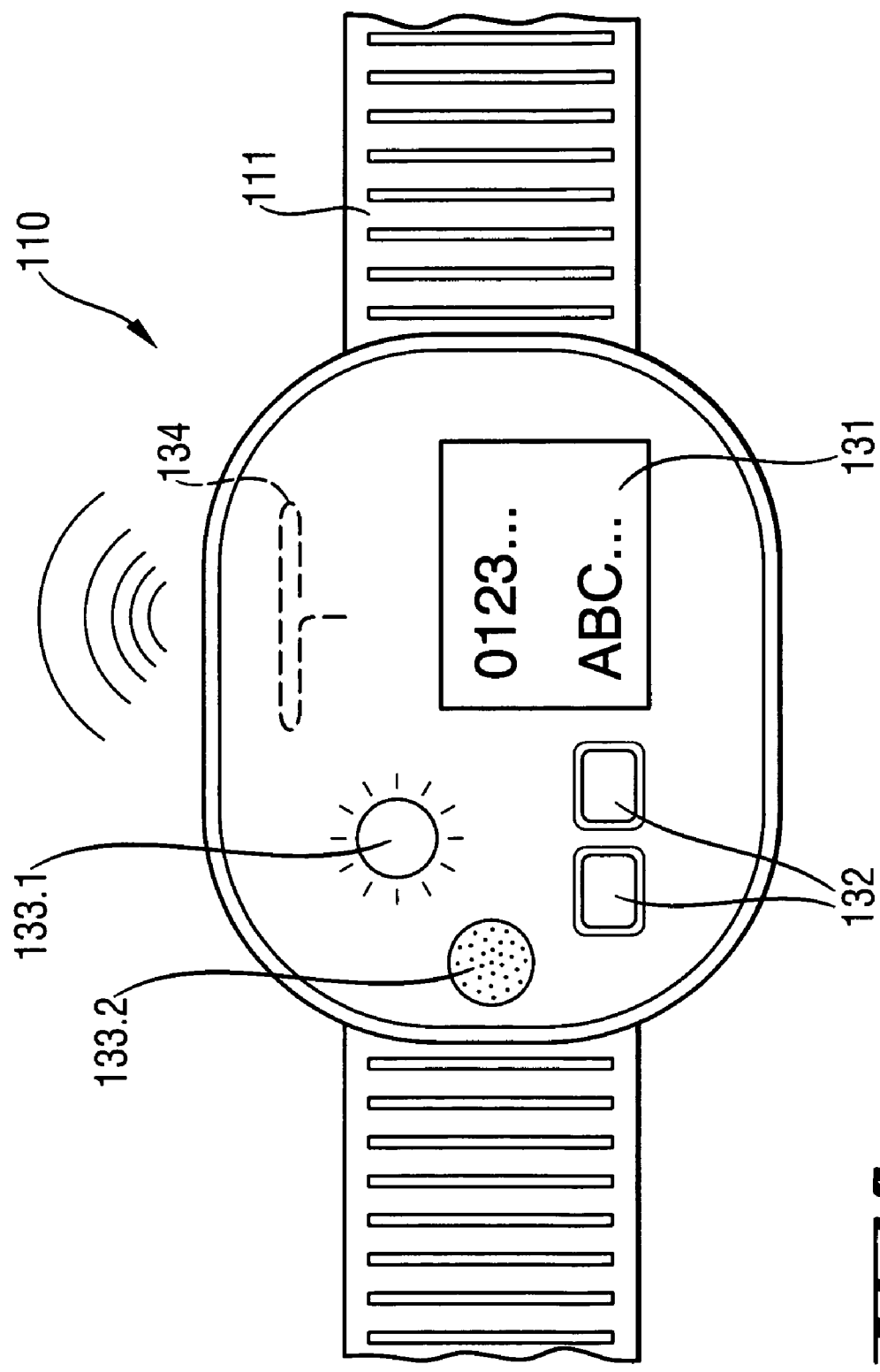
FIG. 2 shows an interface in the form of a vibrational strain measuring device for use in accordance with the present invention.
Figure 3:
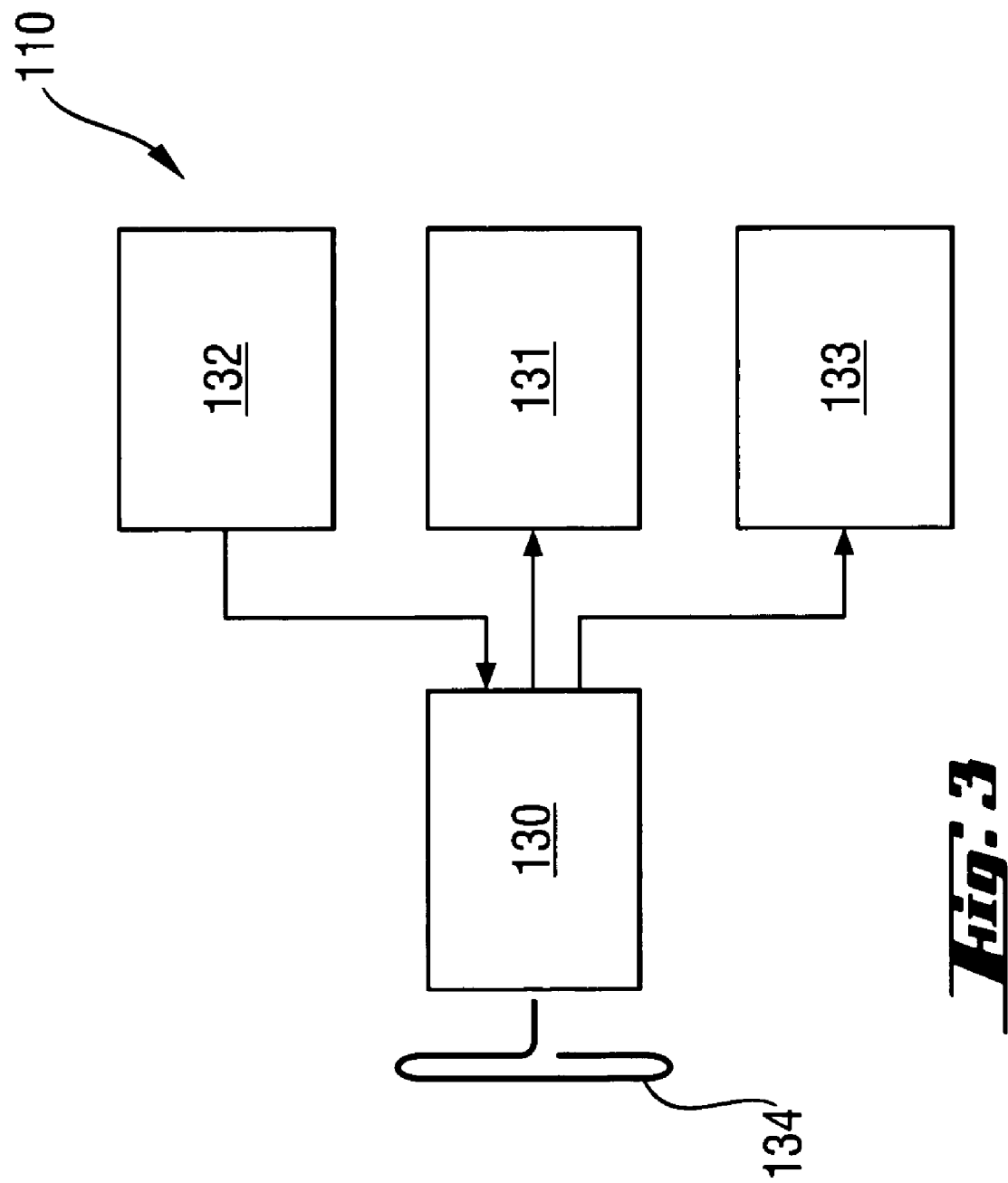
FIG. 3 shows a block diagram of the interface in FIG. 2.

In the FIGS. 2 and 3, the first embodiment of a portable interface 110 is illustrated as a vibration strain measuring device similar to a watch. The interface 110 is arranged on a watch 111 for an operator to be able to wear this interface 110 on his/her wrist. The interface 110 shows a data reproduction unit 131 such as an alphanumeric display according to FIG. 2. The operator is shown the percentage of the attained vibration or acceleration force A on a working day via this display, wherein:

$$A = \sqrt{\left(1/T_0 \sum_{i=1}^{n} a_{hvi}^2 T_i\right)}$$

and wherein:

$a_{hvi}$=total value of oscillations or accelerations of the i$^{th}$ operation with a working tool, n=number of single oscillation effects such as, for example, setting operations, $T_i$=duration of the i$^{th}$ operation (i.e. one hour working with a working tool).

The operator can control the reproduction on the display or switch between various operating modes using the controls 132. Another feature on the interface 110 is an acoustic signal 133.2, in the form of a piezo buzzer and a visual signal 133.1, in the form of a light-emitting diode. An antenna 134 serves to receive and send data in communication with the interface 30 arranged on the hand-held tool via the antenna 34. In the block diagram in FIG. 3, the switching of the interface is shown schematically. As illustrated, the interface shows a device for data communication 130, which is in direct connection to the controls 132, the signals 133, and the data reproduction unit 131. The device for data communication 130 can also be provided with a microprocessor and permanent storage memory such that the acceleration force or vibration strain recorded on the working tool can be temporarily stored in a change of devices by the operator n and then transmitted to a further hand-held tool at the beginning of operations with this new tool, thus providing the operator a complete overview of all vibrations or accelerations A recorded on one day. The sum of all recorded dosis rates or strains A can of course be directly viewed on the vibration strain measuring device or on the interface. If the maximum, permissible vibrational strain, $A_{max}$ is reached—this is pre-set using controls 132—then the device for data communication 130 sends an alarm to the signals 133 or 133.1 and 133.2. The operator is thus informed visually and acoustically of having reached the maximum acceleration or vibration strain $A_{max}$.

Figure 4:
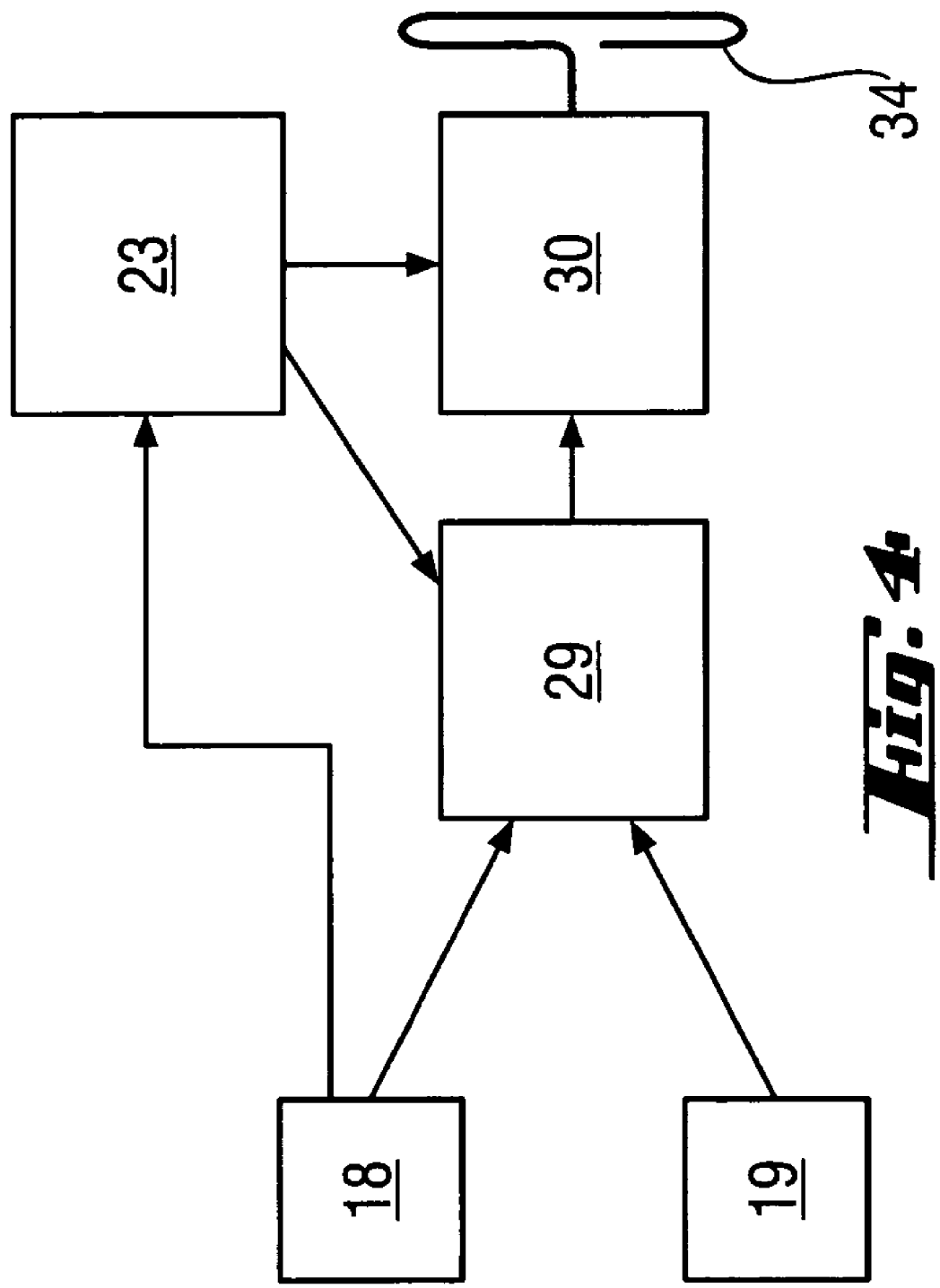
FIG. 4 shows a block diagram of the second embodiment of a hand-held tool in accordance with the present invention.

As illustrated in the block diagram in FIG. 4, a hand-held tool according to the invention, shows a sensing device with an acceleration sensor 18 and a discriminator 19, the measuring values are fed directly into a filter 29 such as a digital/analogue converter, which transmits the data directly to an interface 30 for data communication. For the initialization of the filter 29 and the interface 30, an initialization impulse is triggered via the acceleration sensor 18 such as an Piezo-ceramic pick-up, through which the sensing device is awakened from its sleep mode. When such a hand-held working tool, like a setting device, is put into operation, the raw and unprocessed acceleration data conveyed, which has not been evaluated in the sensing device of the hand-held working tool, is sent as an electromagnetic impulse via the interface 30 for data communication and an antenna 34.

Figure 5:
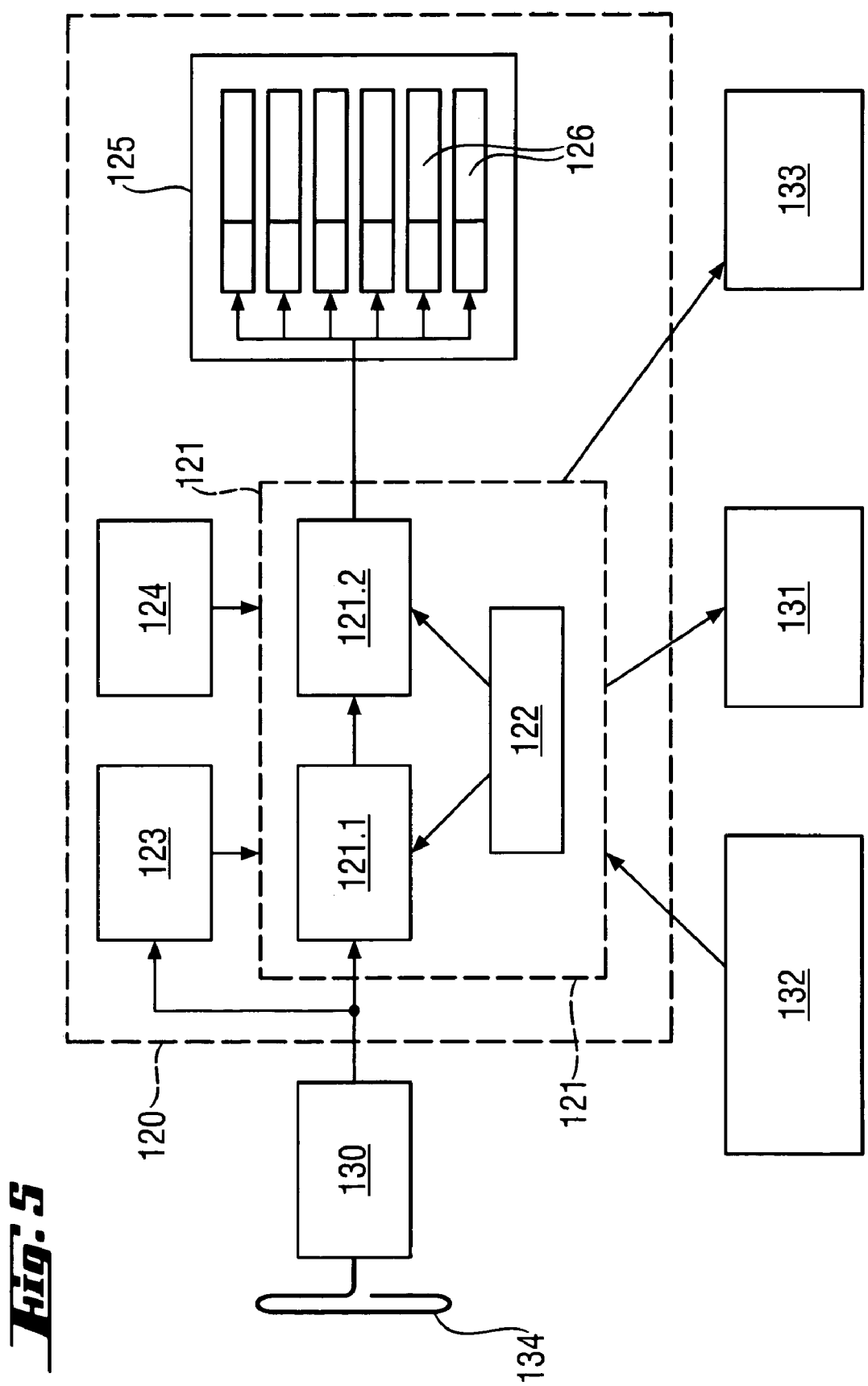
FIG. 5 shows a block diagram of the second embodiment of an interface, for use in accordance with the present invention.

This data is picked up by an interface according to FIG. 5, which the operator of the hand-held tool carries.

As illustrated in FIGS. 5 and 6a, the interface 110 can be clipped onto the belt of the operator. The illustrated alternative interface 110 also shows a vibration strain measuring device, which is differentiated from the interface 110 shown in FIGS. 5 and 6a by two main points. The interface 110, as illustrated in FIGS. 5 and 6a, comprises an evaluation and storage unit 120 showing a storage unit 125 divided up into various storage sections 126. n an additional feature, the evaluation and storage unit contains a microprocessor 121 for the evaluation 121.1 and filtering 121.2 of data via the program or the algorithm 122 running in the microprocessor. The data sent from the hand-held tool 10, according to FIG. 4, is received via an antenna 134 on the device for data communication. 130 arranged on the interface and transmitted to the microprocessor 121. At the beginning of a data transmission, the microprocessor 121 is first awakened from a sleep-mode via an initialization impulse 123. This impulse 123 results from the first radio signal being sent to the device for data communication 130. A real-time means 124, in the form of a real-time watch, is provided to record the starting time $t_0$. Via the device for data communication 130 and the attached antenna 134, the interface 110 also comes into contact with the input 27, which is shown as a transponder card, chip card, magnetic stripe card or key-access card. In input 27 are identification characteristics such as user-specific information stored, via which the interface 110 allots a specific operator and a specific storage section 126 of the storage unit 125 to the specific operator from the data received by a setting device.

This feature is preferred when the vibration strain measuring device is not on the operator, but attached to a hand-held tool using appropriate means of fixing. If the operator changes the hand-held tool during working time, then the measured acceleration values can always be allotted to the operator using the tool within the storage unit 125.

The current operator of the hand-held working tool can thus always read the vibration or acceleration force recorded on this working tool on the data reproduction unit 131. A further preferred feature is a writable memory for the input 27, in which the daily strain attained can be stored by a specific operator. If the operator changes the working tool, then this information on acceleration or vibration strains recorded up to that moment in time can be carried over to the next working tool via the input and to the next vibration strain measuring device or interface 110.

The alternative interface 110, as illustrated in FIG. 6b, is also a vibration strain measuring device, yet it is distinguishable from the interface illustrated in FIG. 5 and 6a in that the data assimilated from the input 27, which is featured with a key-access card with magnetic strip (FIG. 6d), is not collected via the device for data communication 130 and the antenna 134, but via a separate means of collecting data 28 arranged in soft magnetic heads, which can read the data from the magnetic strip 27.1 on the means of collecting data 28 or the key-access card (FIG. 6c).

Figure 7B:
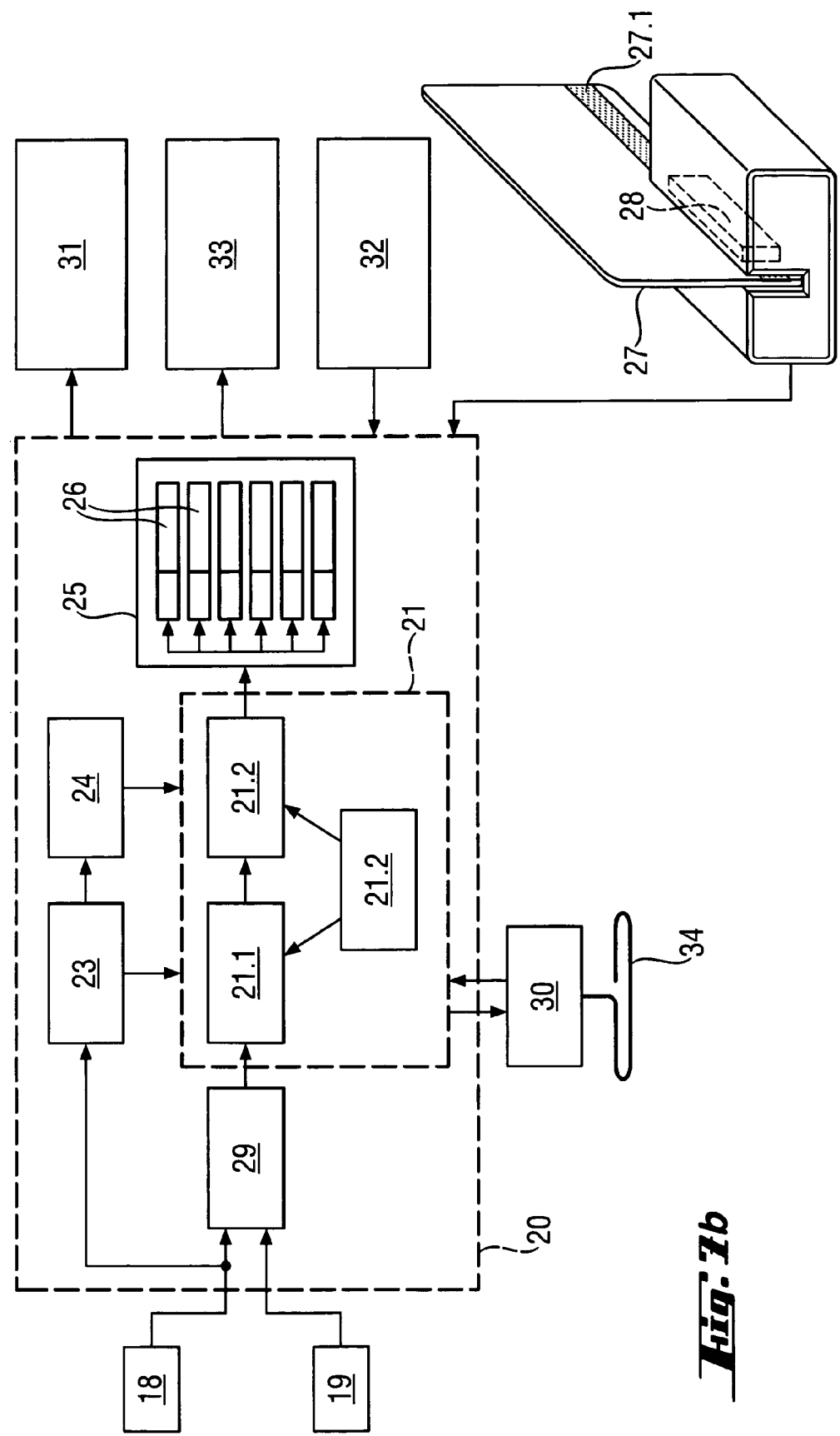

FIGS. 7a and 7b illustrate a further embodiment of a hand-held working tool 10.1, which is at least a partially striking hand-held working tool. A vibration strain measuring device is arranged directly on this hand-held tool 10.1. for the exact registration of accelerations or vibrations a(t) and the acceleration force A, to which the operator is exposed, is at least an acceleration sensor 18 arranged on a handhold 16 of the hand-held working tool. As illustrated in FIG. 7a, controls 32, a data reproduction unit 31.1 such as an alphanumeric display and a visual and acoustic signal 33.1 and 33.2 are arranged on the hand-held tool 10.1, the function of which is described in FIGS. 1–6a.

As illustrated in the block diagram of FIG. 7b, the alternative evaluation and storage mechanism 20 shows a storage unit 25 that contains numerous storage sections 26 in comparison to mechanism illustrated in FIG. 1b. Additionally, this sensing device includes an interface 110 for data output such as a data reproduction unit 31.1 (FIG. 7a) in addition to the interface for data communication 30 with the antenna 34. The data reproduction unit 31.1 and signal elements 33 respond directly to the evaluation and storage mechanism 20. An operator, who has been identified according to a means of input 27, such as a magnetic stripe card on the data reading device 28 of the hand-held tool 10.1, can extract the conveyed acceleration force from accelerations and vibrations from the data reproduction unit 31.1. Surpassing this maximum, permitted daily acceleration force will be shown by a signal 33 in the form of an acoustic or visual signal. The descriptions in FIGS. 1a, 1b and 5 can be viewed to gain additional information concerning reference numbers not explicitly explained.

Measuring data from a hand-held working tool 10, 10.1 are read via the interface, as illustrated in FIG. 8, and then directly transmitted to the data reproduction unit 131 on the interface 110, as well as to the port 135 connected to a computer 140 such as a PC, on which the data are evaluated using the appropriate software in view of the hand-held working tool 10, 10.1 (FIG. 1a and FIG. 7a) previously carried out settings n, working hours $\Sigma|T|$, acceleration values a(t), acceleration force A and wear parameter V etc.

It should be noted, that the interface illustrated in FIG. 8 can include an appropriate assembly, as illustrated in FIGS. 3 and/or 5. Thus, the previous description refers to these Figs.

Figure 9:
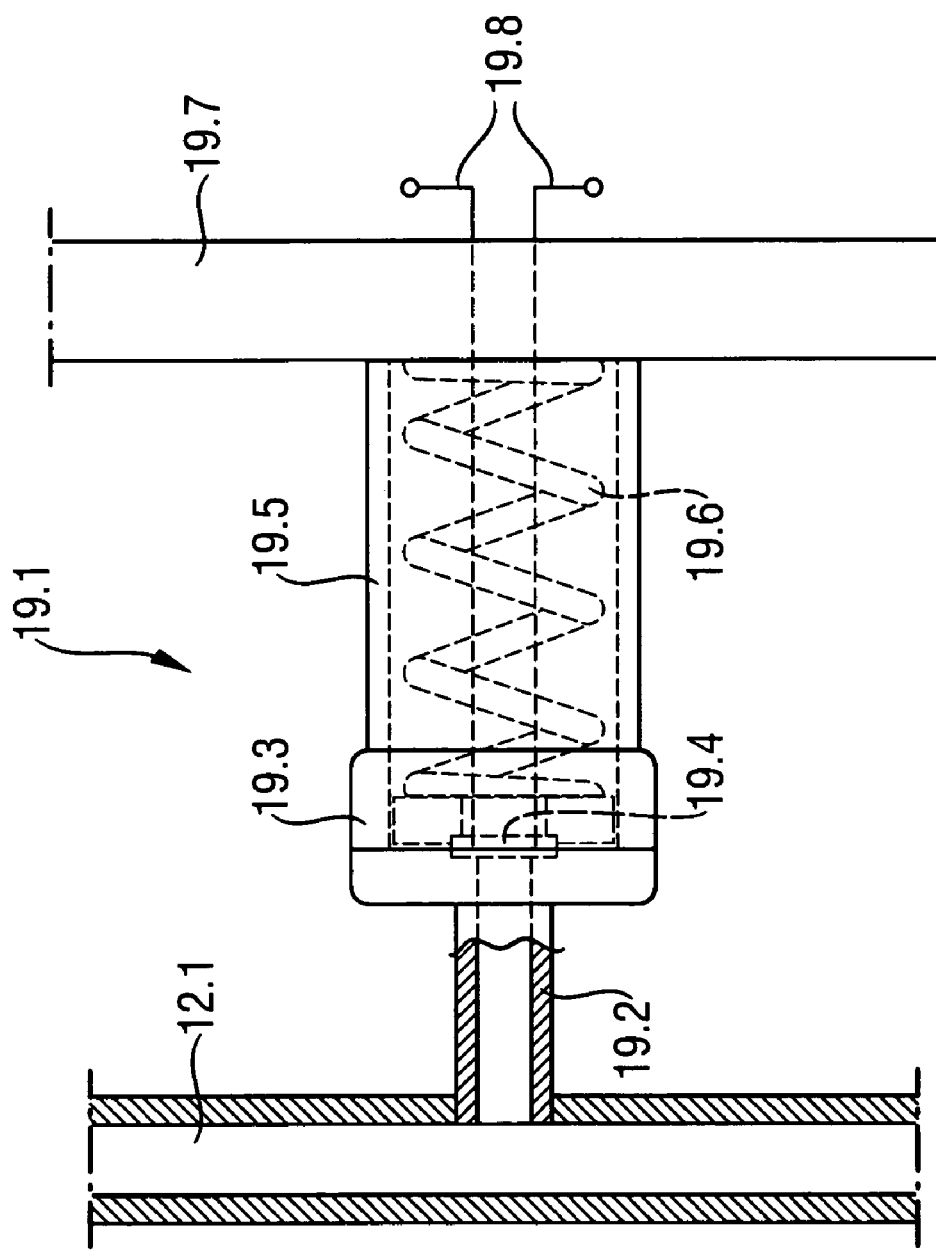

If the hand-held tool 10 is shown as the first embodiment in the form of a setting device, then it is advantageous to use a pressure sensor 19.1 as discriminator 19 (see FIG. 9). This pressure sensor is arranged on a setting device such that the connection nozzle 19.2 protrudes into a conducting space 12.1 for combustion gas in the setting device. When a setting process on the setting device is triggered, then the expanding gas-or the combustion gas flow into this space 12.1 whereby the compression wave over the connection nozzle 19.2 is sensed by a pressure absorber 19.3 with a semi-conductor pressure sensor 19.4. The pressure pick-off 19.3 is arranged on part of the housing 19.7 of the setting device cushioned from vibrations using a spring element 19.6 and cushion tube 19.5. The pressure sensor 19.1 is then connected with the evaluation and storage mechanism via electrical lines 19.8.

The connection nozzle 19.2 can also be connected to part of the device via a tube, in which the ignition of the propellant creates a gas compression wave (not illustrated here), instead of directly protruding into a space 12.1.

Figure 10:
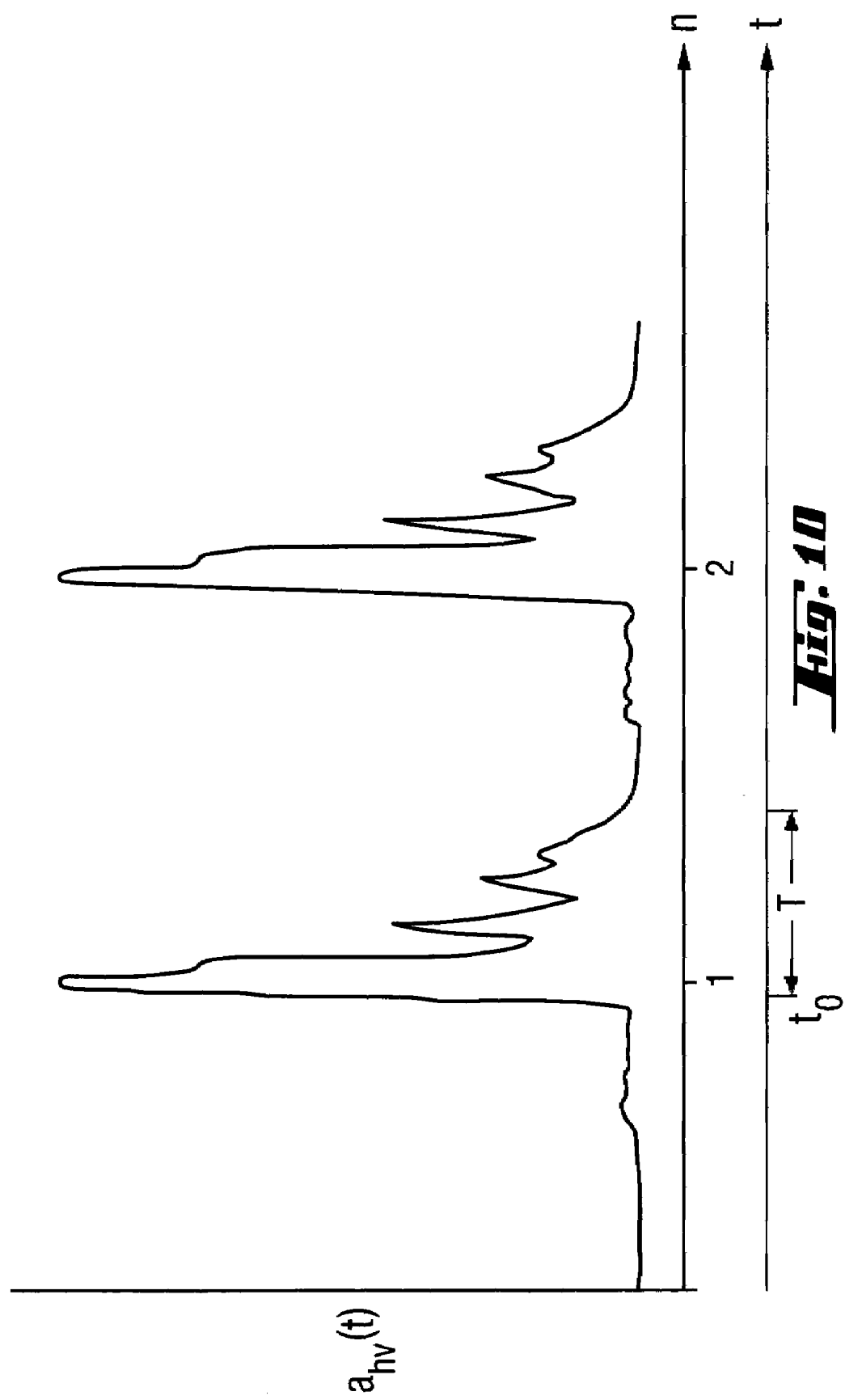
FIG. 10 schematic, a diagram in which the load values $a_{hv}(t)$ are plotted against time t and the number n of vibrations.

In the diagram in FIG. 10, the amounts of the acceleration values $\underline{a}(t)$ of two setting processes (n=2) are plotted as frequency-valued acceleration or oscillation values $a_{hv}(t)$ against the time t. At the point in time $t_0$ to the sensing device or the microprocessor of the hand-held working tool and/or the interface are awakened.

The acceleration values $a_{hv}(t)$ of a setting lie within a time period T.

What is claimed is:

1. Hand-held working tool for driving fastening elements including one of nails, bolts, and pins into a surface and an at least partially striking hand-held tool comprising: a housing (11) including a work mechanism including one of a setting mechanism and a striking mechanism; at least one sensing device (17) for detecting acceleration forces a(t) occurring during one of a setting and a striking impulse; and a handle part, wherein an interface (30, 31) for at least one of data communication and data output is arranged on said hand-held tool, and wherein the sensing device (17) includes at least one discriminating means (19) for differentiating between impulses caused by said one of a setting and a striking impulse and other acceleration forces.

2. The hand-held working tool of claim 1, wherein said hand-held device (10) has an evaluation and storage mechanism (20) for processing and storing data ($\underline{a}$(t), A, $t_0$, T) detected by said sensing device (17).

3. The hand-held working tool of claim 1, wherein the sensing device (17) comprises at least one acceleration sensor (18).

4. The hand-held working tool of claim 3, wherein the sensing device (17) is arranged on said handle (16) of the hand-held working tool (10, 10.1).

5. The hand-held working tool of claim 1, wherein the interface (30) of the hand-held working tool (10, 10.1) comprises an external interface (11) for one of data input and data output that has a device (13) on the hand-held working tool (10, 10.1) for data communication with the interface (30) for data communication.

6. The hand-held working tool of claim 5, where said external interface (110) includes an evaluation and storage means (120) for processing and storage of the data detected by the sensing device (17).

7. The hand-held working of claim 5, wherein said external interface (110) has an optical data display unit (131), operating elements (132), and signal means (133).

8. The hand-held working tool of claim 7, wherein said hand-held working tool (10) has an optical data display unit (31.1), operating elements (32), and signal means (33).

9. The hand-held working tool of claim 8, wherein the evaluation and storage unit (20, 120) includes a microprocessor (21, 121) and at least one algorithm (22, 122) for detecting the physiological acceleration load A absorbed by an operator, from the detected data (a(t), A, $t_0$, T).

10. The hand-held working tool of claim 9, wherein an input means (27) is present at least for entry of user-specific identification characteristics.

11. The hand-held working tool of claim 10, wherein the external interface (110) comprises user-specific identification characteristics that can be communicated.

12. The hand-held working tool of claim 11, wherein a means (23, 123) for initializing the microprocessor (21, 121) for exiting a sleep-mode of said sensing device (17) is provided.

13. The hand-held working tool of claim 12, wherein one of the sensing device (17) and the evaluation and storage means (20, 120) contains a means (24, 124) for real-time measurements.

14. The hand-held working tool of claim 12, wherein said storage means (25, 125) comprises storage areas (26, 126) that are each allocated to a specific operator via said operator-specific identification characteristics.

15. An interface unit, for use with the hand-held working tool (10, 10.1) of claim 14, where in the external interface (110) acts as a device (13) for data communication with the interface (30) for data communication with said hand-held working tool (10, 10.1).

16. The interface unit of claim 15, wherein the external interface (110) comprises an evaluation and storage means (120) for processing and storing data (a(t), A, $t_0$, T) detected by the sensing device (17).

17. The interface unit of claim 16, wherein the evaluation and storage means (12) comprises a microprocessor (121) and at least one algorithm (22, 122) for the detection of said physiological acceleration loads A absorbed by the operator, from the given data (a(t), A, $t_0$, T).

18. The interface of claim 17, wherein the external interface (110) comprises user-specific identification characteristics that can be communicated.

19. The interface unit of claim 17, wherein a means (123) for initializing the microprocessor (121) for exiting a sleep-mode of an initialization impulse (123) is provided.

20. The interface unit of claim 19, wherein at least one of the external interface (110) and the evaluation and storage means (12) comprises a means for real-time measurements.

21. The interface unit of claim 20, wherein the external interface (110) is a vibration load meter that can store data ($\underline{a}$(t), A, $t_0$, T) relating to different operators using operator-specific identification characteristics.

22. The interface unit of claim 15, wherein the external interface (110) has an optical data display unit (131), operating means (132), and signal means (133).

23. The hand-held working tool of claim 1, wherein the sensing device (17) further includes a pressure sensor (19.1) for gaseous media for the detection of gas compression waves released by a setting operation in the working mechanism (12).

* * * * *